(12) United States Patent
Park et al.

(10) Patent No.: US 12,428,096 B2
(45) Date of Patent: Sep. 30, 2025

(54) STEERING AND SUSPENSION DEVICE OF VEHICLE BODY

(71) Applicants: HYUNDAI MOTOR COMPANY, Seoul (KR); KIA CORPORATION, Seoul (KR)

(72) Inventors: Jiseo Park, Hwaseong-si (KR); Tae Han Kang, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/978,404

(22) Filed: Dec. 12, 2024

(65) Prior Publication Data
US 2025/0196963 A1    Jun. 19, 2025

(30) Foreign Application Priority Data
Dec. 13, 2023 (KR) .................. 10-2023-0181028

(51) Int. Cl.
*B62K 5/05* (2013.01)
*B62K 21/00* (2006.01)

(52) U.S. Cl.
CPC ............. *B62K 21/00* (2013.01); *B62K 5/05* (2013.01)

(58) Field of Classification Search
CPC .......... B62K 21/00; B62K 5/05; B62K 5/027; B62K 5/02; B60Y 2400/84; B62D 3/04; B62D 5/0454; B62D 61/065; B62D 7/023
See application file for complete search history.

(56) References Cited

U.S. PATENT DOCUMENTS

| | | | | |
|---|---|---|---|---|
| 2,038,843 A | * | 4/1936 | Jones | B62D 61/065 280/124.128 |
| 7,676,310 B2 | * | 3/2010 | Klein | B62D 15/0285 701/41 |
| 10,703,152 B2 | * | 7/2020 | Hall | B60G 7/001 |
| 2023/0052313 A1 | * | 2/2023 | Cai | B62D 5/0421 |

FOREIGN PATENT DOCUMENTS

KR    101516962 B1  *  5/2015
KR    101806884 B1  *  12/2017

OTHER PUBLICATIONS

Park, KR 101516962 B1, Machine Translation of Specification (Year: 2015).*
Park, KR 101806884 B1, Machine Translation of Specification (Year: 2017).*

* cited by examiner

*Primary Examiner* — Paul N Dickson
*Assistant Examiner* — Matthew Joseph Ganci
(74) *Attorney, Agent, or Firm* — MCDONNELL BOEHNEN HULBERT & BERGHOFF LLP

(57) ABSTRACT

A steering and suspension device of a vehicle includes a steering motor fixed to and disposed in a vehicle body at a rear side of the vehicle, and providing a driving force for steering, a worm gear connected to the steering motor, and rotated by the driving force of the steering motor; a steering device connection assembly of which one end is connected to the worm gear, and turned in a transverse direction of the vehicle when the worm gear rotates; a suspension connected to the other end of the steering device connection assembly, and providing damping and shock absorption to the vehicle body; and a wheel connected to the suspension and rotated while being supported on a ground surface to allow the vehicle to move.

11 Claims, 9 Drawing Sheets

STEERING AND SUSPENSION DEVICE OF VEHICLE BODY

CROSS REFERENCE TO RELATED APPLICATIONS

This application claims priority to and the benefit of Korean Patent Application No. 10-2023-0181028 filed in the Korean Intellectual Property Office on Dec. 13, 2023, the entire contents of which are incorporated herein by reference.

BACKGROUND

(a) Field

The present disclosure relates to a steering and suspension device of a vehicle body, and more particularly, to a steering and suspension device structure of a vehicle body with a 1-wheel rear wheel, which can reduce a rotary radius of a vehicle.

(b) Description of the Related Art

In recent years, an automotive industry has introduced a new concept of future mobility vision for implementing a human-centered dynamic future city. One of the future mobility solutions is a purpose built vehicle (PBV) as a purpose based mobility.

An electric vehicle (EV) based eco-friendly mobile vehicle can be taken as an example of the PBV. The PBV can provide various customized services to a user for a time for which the PBV moves from a departure point to a destination by an unmanned or manned autonomous driving scheme.

Such a PBV can be constituted by a cap type driving module adopting a driving device, and capable of autonomous driving, and a space module coupled to the driving module, and used for cargo transportation, seater, home office, etc.

An independent steering system capable of mobility and parking convenience in a narrow space is developed to be applied to a vehicle by coupling of the driving module and the space module.

As illustrated in FIG. 1, in existing 2-wheel steering, angles of an inner wheel and an outer wheel have an Ackerman steering angle, and due to presence of a suspension link and a housing package, a maximum inner wheel steering angle cannot but be formed at approximately 40°, so such a 2-wheel steering system, there is a limit in a maximum rotational angle of the inner wheel.

In order to overcome such a limit, the existing independent steering system is a technology that intends to reduce the rotary radius of the vehicle by independently steering a wheel 2 installed in a vehicle body 8 at one side of the vehicle as illustrated in FIG. 2, but this includes multiple components such as a steering motor 3, a suspension ring 6, and revoknuckle 4, and is a 4-wheel structure, so a lot of space is required and there is a problem in that a structure is complex.

Accordingly, in order achieve optimal vehicle packaging while reducing the rotary radius of the vehicle, development of a suspension and steering system device having one rear wheel is required.

SUMMARY

Accordingly, an embodiment of the present disclosure attempts to provide a steering and suspension device with a 1-wheel rear wheel, which can reduce a rotary radius of a vehicle by maximizing a steering angle in a PBV vehicle by combining a driving module and a space module.

An embodiment of the present disclosure provides a steering and suspension device of a vehicle including a steering motor fixed to and disposed in a vehicle body at a rear side of the vehicle, and providing a driving force for steering, a worm gear connected to the steering motor, and rotated by the driving force of the steering motor; a steering device connection assembly of which one end is connected to the worm gear, and turned in a transverse direction of the vehicle when the worm gear rotates, a suspension connected to the other end of the steering device connection assembly, and providing damping and shock absorption to the vehicle body, and a wheel connected to the suspension and rotated while being supported on a ground surface to allow the vehicle to move.

The worm gear may be constituted by a worm connected to a rotary shaft of the steering motor, and rotated jointly with the rotary shaft of the steering motor, and a worm wheel engaged with the worm, and rotated by rotation of the worm.

The worm may be formed in a shaft form, and a thread may be formed on an outer peripheral surface of the worm, the worm wheel may be formed in a circular plate shape, and a sawtooth may be formed at an end of the worm wheel, and the driving force of the steering motor may be converted into a rotational force of the worm wheel by the engagement of the thread and the sawtooth.

The sawtooth may be formed only at one portion of the end of the worm wheel, and a rotary radius of the worm wheel may be set according to a forming portion of the sawtooth.

One end of the steering device connection assembly may be connected to a center of the worm wheel, and rotated in synchronization with the rotation of the worm wheel.

The worm wheel may be connected to one end of the steering device connection assembly, and disposed in a direction vertical to a longitudinal direction of the steering device connection assembly.

The suspension may include a triple tree of which one end is connected to the other end of the steering device connection assembly, a fixation fork of which one end is connected to the other end of the triple tree, a movable fork of which one end is connected to cover an outer peripheral portion of the fixation fork and move along an axis of the fixation fork, and a wheel fastening shaft connected to a central axis of the wheel at the other end of the movable fork, and serving as a rotary shaft of the wheel.

The movable fork may reciprocate by a hydraulic pressure.

The steering motor may be connected to a steering controller (ECU) of the autonomous driving (AD) system by a sensor, and the steering motor may generate a rotational force required for a steering angle and a steering direction by determination of the steering controller using external vehicle information sensed by the sensor.

The sensor may include a radar sensor.

The vehicle may be a PBV constituted by a driving module and a space module coupled to a rear end of the driving module.

One steering and suspension device of the vehicle may be provided at a center portion of the vehicle body at the rear side of the vehicle.

According to an embodiment of the present disclosure, one rear-wheel steering shaft is provided to maximize a steering angle, so it is advantageous when being applied to a vehicle having a small rotary radius.

Further, a rear-wheel steering and suspension device can be implemented by a small number of components, so a structure can be simplified and an occupied space can be reduced. Accordingly, installation cost can be reduced and productivity can be reduced, and a weight of a vehicle is reduced to improve fuel efficiency.

Further, a steering angle and a steering direction are determined in an autonomous driving system through information sensed by a sensor, and this is operated by a motor to be commonly applied to an automated PBV.

DETAILED DESCRIPTION

Figure 1:
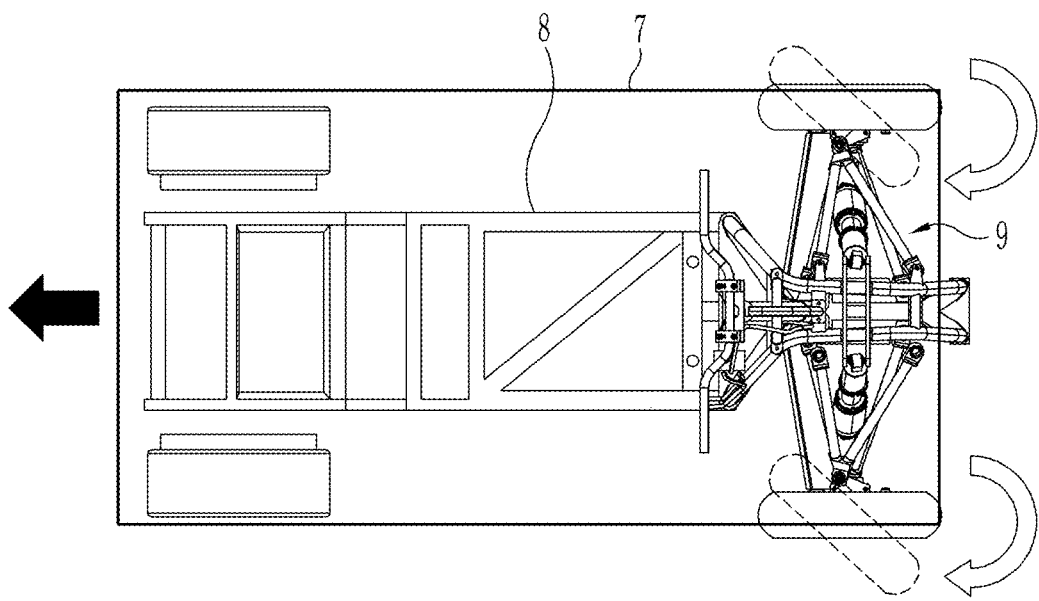
FIG. 1 is a diagram illustrating the existing rear-wheel 2-wheel steering system.
Figure 2:
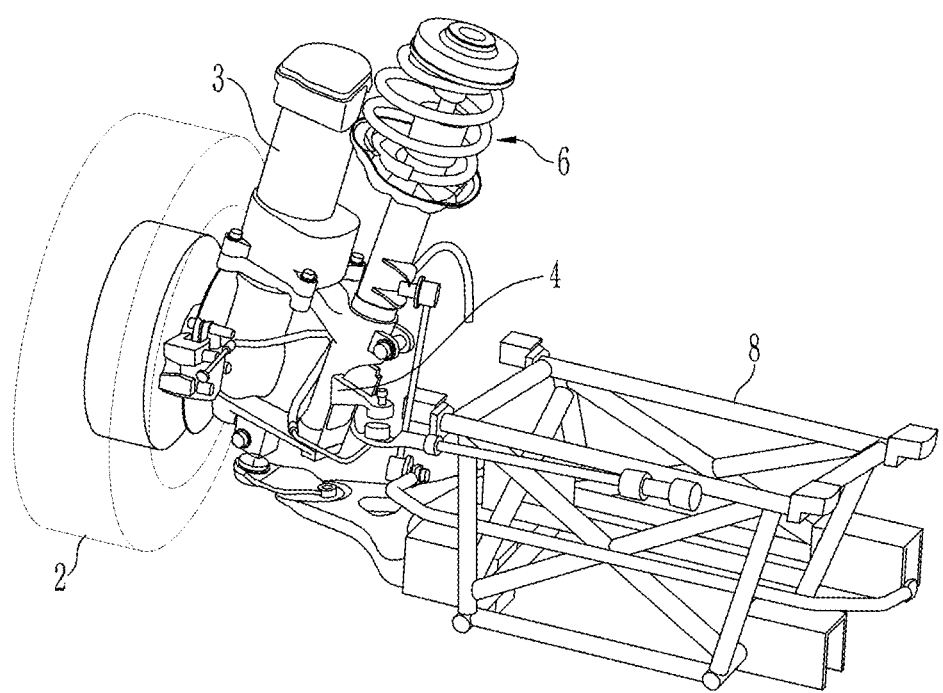
FIG. 2 is a diagram illustrating the existing independent steering system.

Hereinafter, an embodiment of the present disclosure will be described more fully hereinafter with reference to the accompanying drawings so as to be easily implemented by those skilled in the art. The present disclosure may be implemented in various different forms and is not limited to embodiments described herein.

In addition, in various embodiments, the components having the same configuration will be described in an embodiment using the same reference numeral, and in other embodiments, only a different component from an embodiment will be described.

The drawings are schematic and not illustrated according to a scale. The relative dimensions and ratios of the parts in the drawings are exaggerated or reduced in their sizes for clarity and convenience in the drawing, and any dimensions are just exemplary, not limited. In addition, the same structure element or component in two or more drawings is used to show similar characteristics of the same reference numeral. When any part of or referred to as being "on", "over" the other part, which might be directly on or over the other parts or the other part may involve therebetween.

The embodiment of the present disclosure specifically represents one embodiment of the present disclosure. As a result, various transformations of the diagrams are expected. Therefore, the embodiment is not limited to a specific form of the illustrated area, for example, also includes a modification of the form of manufacture.

Hereinafter, a steering and suspension device structure of a vehicle according to an embodiment of the present disclosure will be described in detail with reference to the accompanying drawings.

Figure 3:
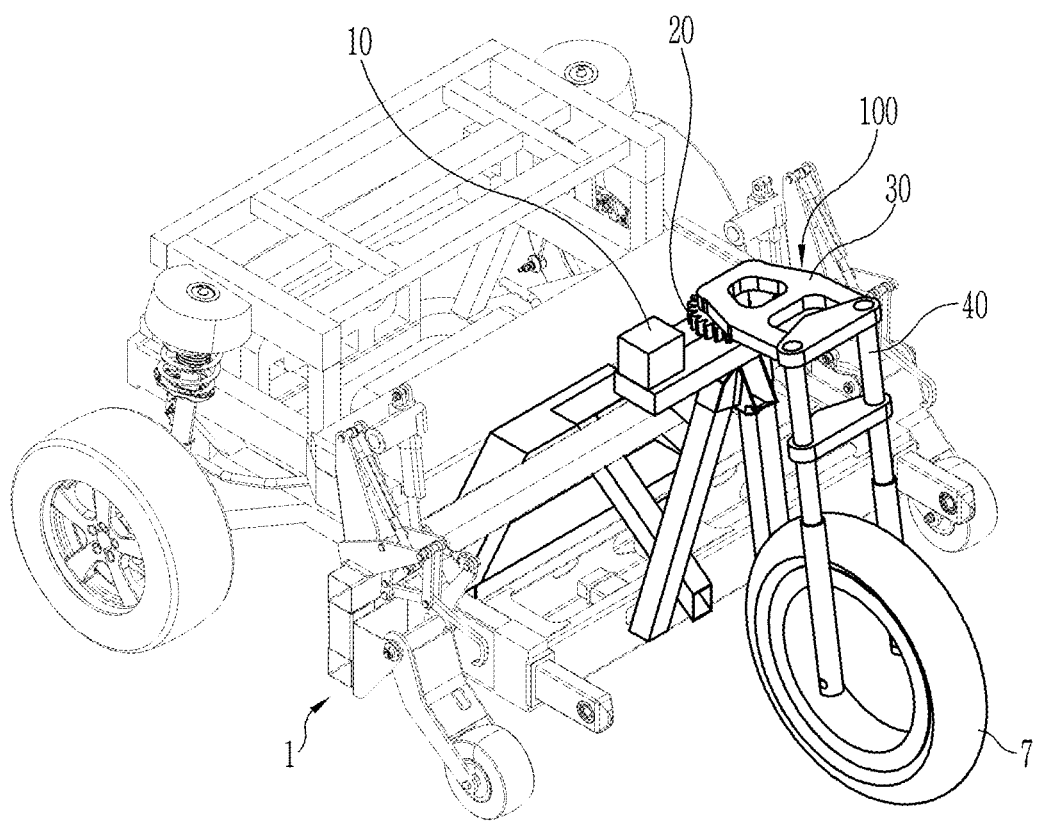
FIG. 3 is a perspective view schematically illustrating a steering and suspension device of a vehicle according to an embodiment of the present disclosure.
Figure 4:
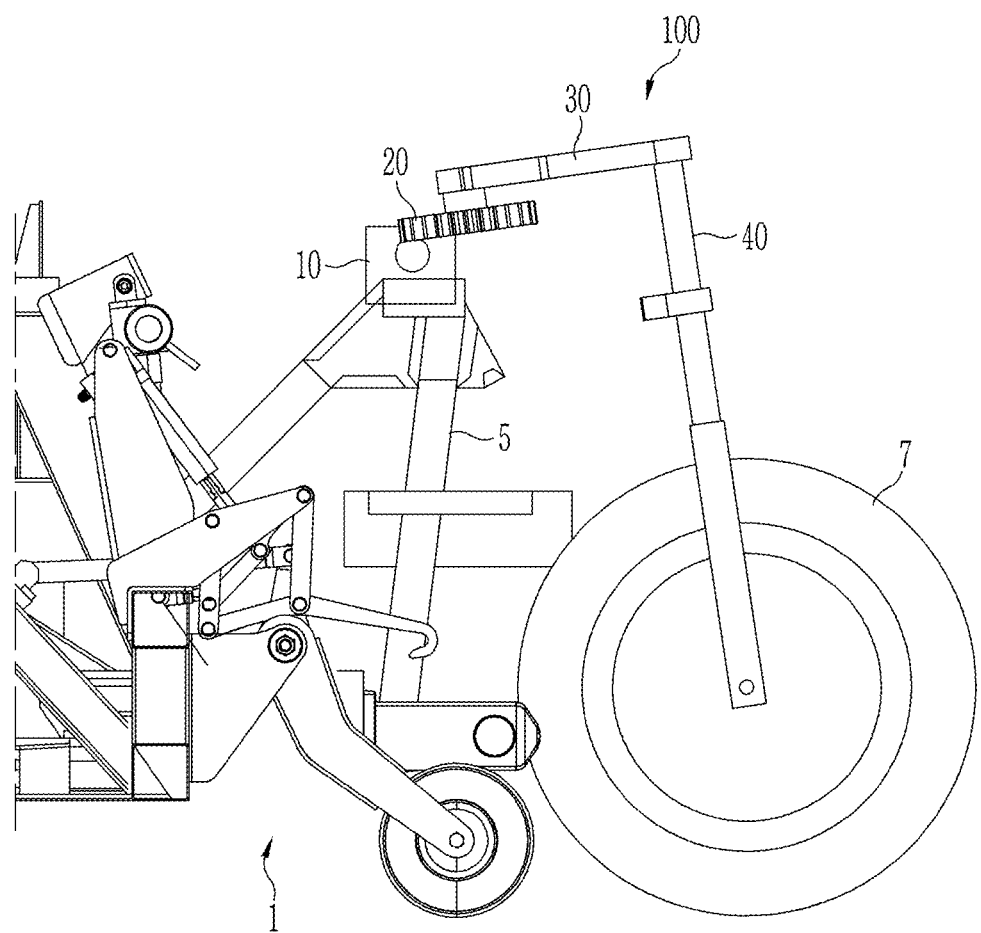
FIG. 4 is a side view schematically illustrating a steering and suspension device of a vehicle according to an embodiment of the present disclosure.

FIG. 3 is a perspective view schematically illustrating a steering and suspension device of a vehicle according to an embodiment of the present disclosure, and FIG. 4 is a side view schematically illustrating a steering and suspension device of a vehicle according to an embodiment of the present disclosure.

Referring to FIGS. 3 and 4, the steering and suspension device 100 of a vehicle according to an embodiment of the present disclosure includes a steering motor 10, a worm gear 20, a steering device connection assembly 30, a suspension 40, and a wheel 7.

The steering motor 10 may be fixed to a support 5 fixedly disposed to a vehicle body 1 in the rear of the vehicle and may provide a driving force for steering. The vehicle may be a PBV constituted by a driving module and a space module coupled to a rear end of the driving module, and the steering motor 10 may be installed on the support 5 fixedly disposed at a center portion of the vehicle body 1 in the rear of the driving module. The steering motor 10 may be disposed with a rotary shaft to extend in a transverse direction of the vehicle.

The steering motor 10 may receive power from a battery mounted on the driving module.

The worm gear 20 is connected to the steering motor 10, and rotates by the driving force of the steering motor 10. The worm gear 20 is connected to the rotary shaft of the steering motor 10 to convert rotation in a longitudinal direction of the vehicle of the rotary shaft into rotation in a transverse direction of the vehicle. The rotation of the worm gear 20 may allow the steering device connection assembly 30, the suspension 40, and the wheel 7 connected thereto to be turned in the transverse direction of the vehicle.

One end of the steering device connection assembly 30 may be connected to the worm gear 20, and the steering device connection assembly 30 may be turned in the transverse direction of the vehicle by rotation of the worm gear 20 by driving the steering motor 10. The steering device connection assembly 30 may be disposed in a form to extend a rear side of the vehicle in a horizontal direction of the vehicle body 1.

The suspension 40 may be connected to the other end of the steering device connection assembly 30, and the suspension 40 may be turned jointly when the steering device connection assembly 30 is turned, and may provide damping and shock absorption to the vehicle body 1. The suspension 40 may be disposed to extend toward a lower portion in a direction perpendicular to the vehicle body 1 from the other end of the steering device connection assembly 30.

The wheel 7 is connected to the suspension 40, and directly contacts and is supported on a ground surface, and rotates to allow the vehicle to move. The rotary shaft of the wheel 7 may be penetrated and coupled rotatably by a wheel fastening shaft 48 of the suspension 40.

Figure 5:
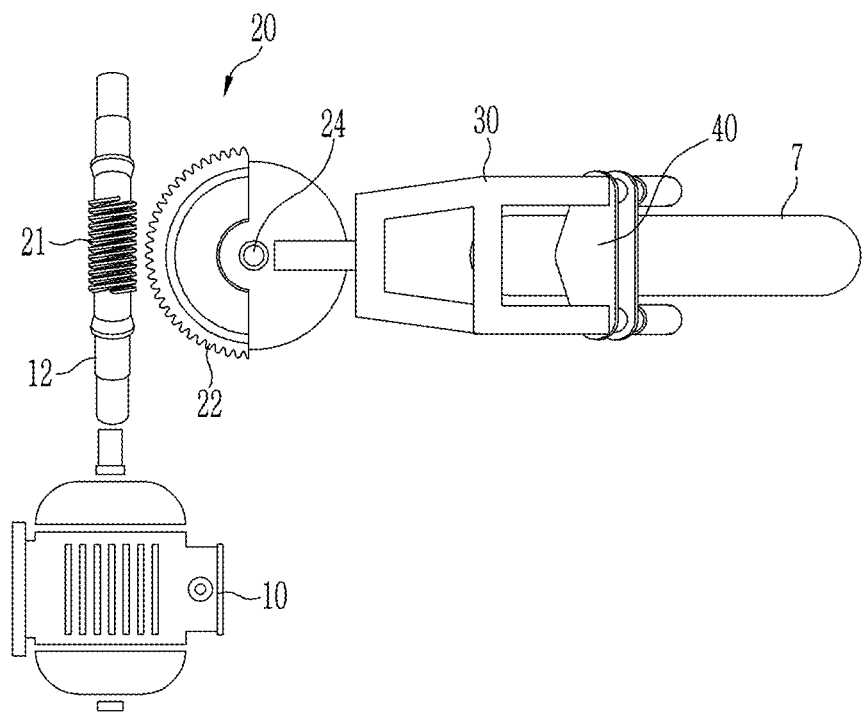
FIG. 5 is a diagram schematically illustrating a steering state upon straight movement of the steering and suspension device of a vehicle according to an embodiment of the present disclosure.
Figure 6:
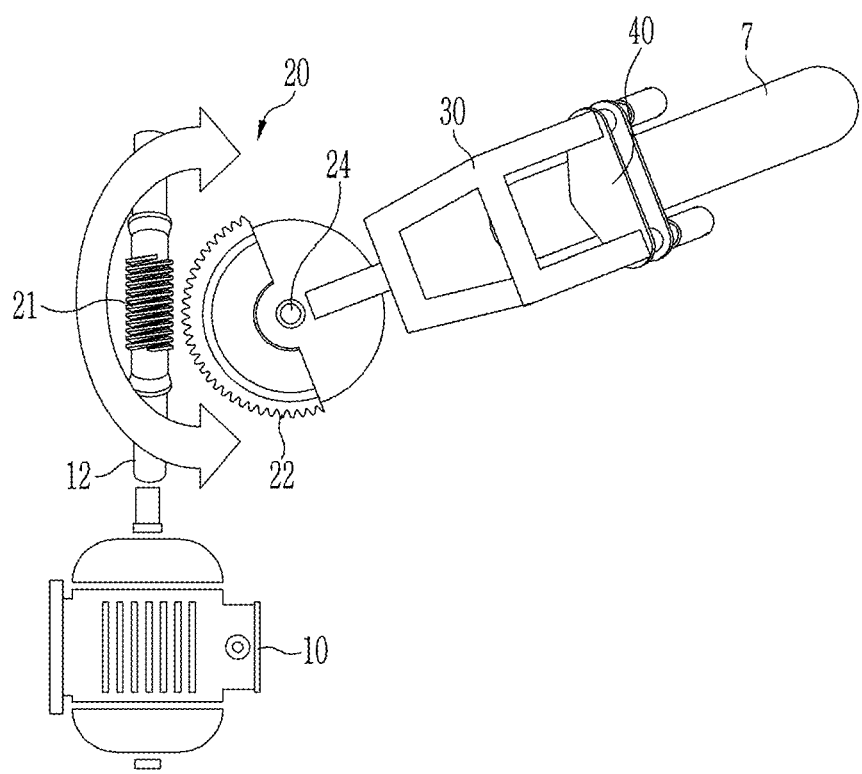
FIG. 6 is a diagram schematically illustrating a steering state upon rotation of the steering and suspension device of a vehicle according to an embodiment of the present disclosure.

FIG. 5 is a diagram schematically illustrating a steering state upon straight movement of the steering and suspension device of a vehicle according to an embodiment of the present disclosure, and FIG. 6 is a diagram schematically illustrating a steering state upon rotation of the steering and suspension device of a vehicle according to an embodiment of the present disclosure.

Referring to FIGS. 5 and 6, the worm gear 20 may be constituted by a worm 21 and a worm wheel 22. The worm 21 is connected to the rotary shaft of the steering motor 10 to rotate jointly with the rotary shaft of the steering motor 10. The worm 21 may be formed in a shaft form, and a thread may be formed on an outer peripheral surface of the worm 21.

The worm wheel 22 is contacted and engaged with the worm 21 to be rotated by the rotation of the worm 21. The worm wheel 22 is formed in a circular plate shape, and a sawtooth is formed at an end of the worm wheel 22. The thread of the worm 21 and the sawtooth of the worm wheel 22 are engaged, so the worm wheel 22 is rotated upon rotation of the worm 21. That is, when the worm 21 rotates in the longitudinal direction of the vehicle, the worm wheel 22 may rotate in the transverse direction of the vehicle.

The sawtooth of the worm wheel 22 is formed only at a portion of the end of the worm wheel 22, and only up to a portion where the sawtooth is engaged with the thread of the worm wheel 22, so a rotary radius of the worm wheel 22 may be set according to a forming portion of the sawtooth.

One end of the steering device connection assembly 30 is connected to the center of the worm wheel 22, so the steering device connection assembly 30 rotates in synchronization with the rotation of the worm wheel 22. That is, the steering device connection assembly 30 may be rotated in the transverse direction of the vehicle according to the rotation in the transverse direction of the vehicle of the worm wheel 22.

Meanwhile, the worm wheel 22 may be connected to one end of the steering device connection assembly 30. Further, the worm wheel 22 may be disposed in a direction vertical to the longitudinal direction of the steering device connection assembly 30.

As illustrated in FIG. 5, when the vehicle moves straight, a center portion of the sawtooth of the worm wheel 22 is positioned to match a center portion of the thread of the worm 21, and the steering device connection assembly 30, the suspension 40, and the wheel 7 are positioned substantially vertically to the worm 21.

Further, as illustrated in FIG. 6, when the vehicle rotates, the worm wheel 22 is rotated by the rotation of the worm 21, and the steering device connection assembly 30, the suspension 40, and the wheel 7 rotates according to the rotation of the worm wheel 22 to form a predetermined steering angle with the worm 21.

Figure 7:
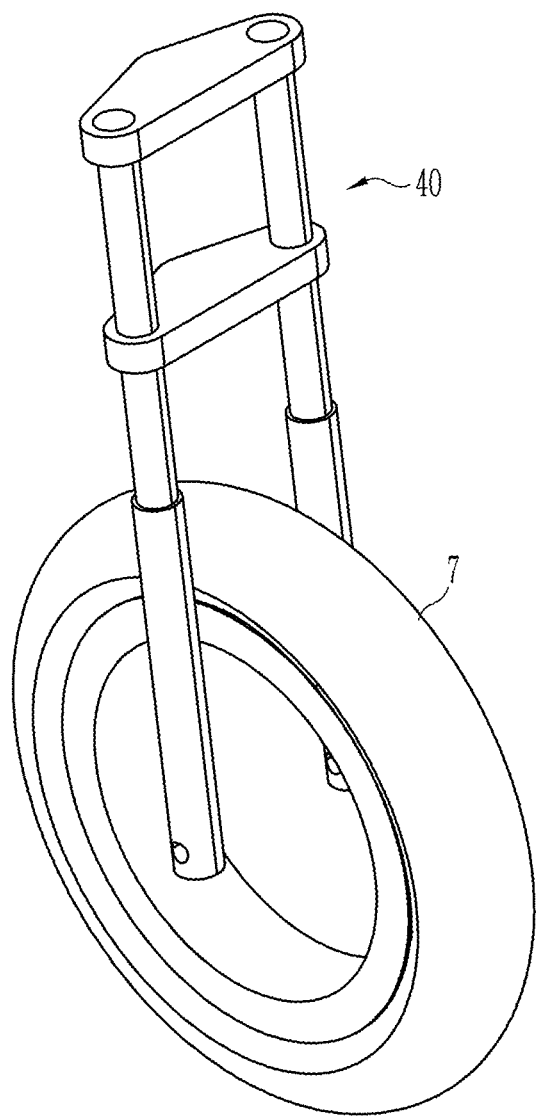
FIG. 7 is a diagram illustrating a suspension and a wheel of the steering and suspension device of a vehicle according to an embodiment of the present disclosure.
Figure 8:
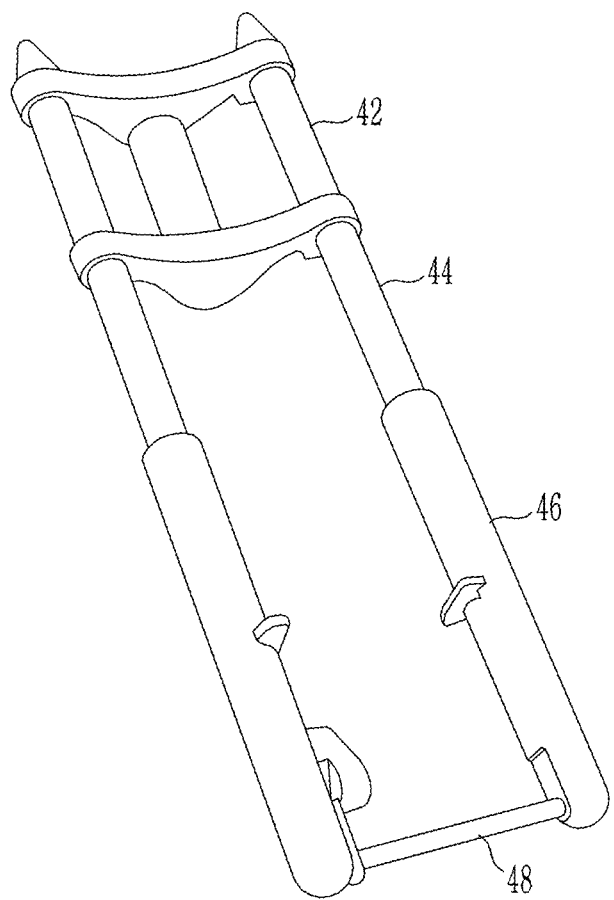
FIG. 8 is a diagram illustrating a detailed structure of the suspension of the steering and suspension device of a vehicle according to an embodiment of the present disclosure.

FIG. 7 is a diagram illustrating a suspension and a wheel of the steering and suspension device of a vehicle according to an embodiment of the present disclosure, and FIG. 8 is a diagram illustrating a detailed structure of the suspension of the steering and suspension device of a vehicle according to an embodiment of the present disclosure.

Referring to FIG. 7, the suspension 40 is formed in a fork structure of a form in which a pair of bars are extended in line, and the wheel 7 is disposed between a pair of bars.

As illustrated in FIG. 8, the suspension 40 includes a triple tree 42 of which one end is connected to the other end of the steering device connection assembly 30, a fixation fork 44 of which one end is connected to the other end of the triple tree 42, a movable fork 46 of which one end is connected to cover an outer peripheral portion of the fixation fork 44 and move along an axis of the fixation fork 44, and a wheel fastening shaft 48 connected to a central axis of the wheel 7 at the other end of the movable fork 46 and serving as a rotary shaft of the wheel 7.

The movable fork 46 may reciprocate in a longitudinal direction of the fixation fork 44 by a hydraulic pressure. When the wheel 7 also moves in an up and down direction in contact with the ground surface, the movable fork 46 also move in the up and down direction, and may absorb shock and vibration applied to the vehicle by a hydraulic pressure formed between the movable fork 46 and the fixation fork 44.

Figure 9:
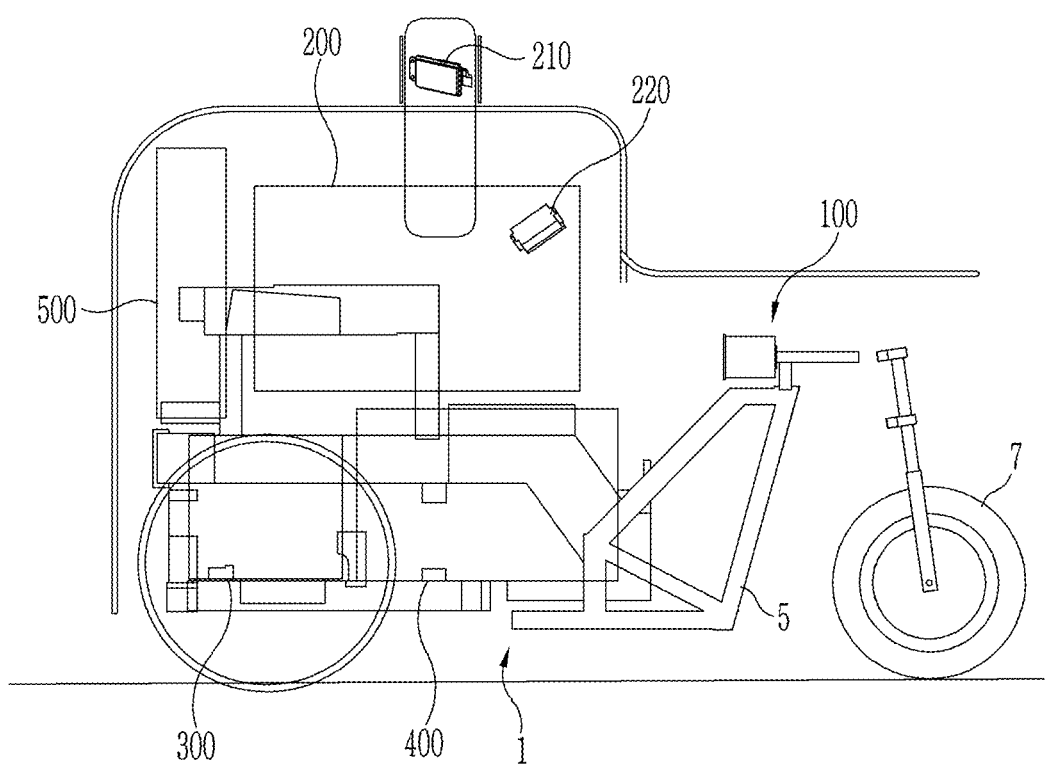
FIG. 9 is a diagram illustrating a state in which the steering and suspension device of the vehicle is applied to the vehicle according to an embodiment of the present disclosure.

FIG. 9 is a diagram illustrating a state in which the steering and suspension device of the vehicle is applied to the vehicle according to an embodiment of the present disclosure.

Referring to FIG. 9, the vehicle may include a high-voltage battery 400 serving a driving power source, a driving motor 300 for front-wheel driving, an autonomous driving (AD) system 200, and a cooling device 500.

The steering motor 10 is connected to a steering controller (ECU) 220 of the autonomous driving (AD) system 200 by a sensor 210.

External vehicle information sensed by the sensor 210 is input into the steering controller 220, and a steering angle and direction signal set by determination of the steering controller 220 is transmitted to the steering motor 10 to generate a rotational force, and the steering motor 10 operates to perform steering of the vehicle.

At this time, the steering controller 220 may be implemented by one or more processors which operate by a set program and the set program may be programmed to perform a steering process of the steering and suspension device 100 of the vehicle body according to the exemplary embodiment of the present disclosure.

The sensor 210 may include a radar sensor. The radar sensor may serve to sense a distance from an object and various physical properties by lighting a laser to a target.

In a PBV constituted by a driving module and a space module coupled to a rear end of the driving module, the steering and suspension device 100 of the vehicle described above may be installed in the driving module, and provided at the center portion of the vehicle body 1 in the rear side of the vehicle as one.

As described above, according to an embodiment of the present disclosure, one rear-wheel steering shaft is provided to maximize a steering angle, so it is advantageous when being applied to a vehicle having a small rotary radius.

Further, a rear-wheel steering and suspension device can be implemented by a small number of components, so a structure can be simplified and an occupied space can be reduced. Accordingly, installation cost can be reduced and productivity can be improved, and a weight of a vehicle is reduced to improve fuel efficiency.

Further, a steering angle and a steering direction are determined in an autonomous driving system through information sensed by a sensor, and this is operated by a motor to be commonly applied to an automated PBV.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

The invention claimed is:

1. A steering and suspension device of a vehicle, comprising:
   a steering motor fixed to a support which is fixed to and disposed in a vehicle body at a rear side of the vehicle, the steering motor being configured to provide a driving force for steering;

a worm gear connected to the steering motor, and configured to be rotated by the driving force of the steering motor;

a steering device connection assembly having a first end connected to the worm gear, and configured to be turned in a transverse direction of the vehicle when the worm gear rotates;

a suspension connected to a second end of the steering device connection assembly, and the suspension configured to provide damping and shock absorption to the vehicle body; and a wheel connected to the suspension and configured to rotate while being supported on a ground surface to allow the vehicle to move;

wherein the suspension includes:
- a triple tree having a first end connected to a second end of the steering device connection assembly;
- a fixation fork having a first end connected to a second end of the triple tree;
- a movable fork having a first end connected to cover an outer peripheral portion of the fixation fork, the movable fork being configured to move along an axis of the fixation fork; and
- a wheel fastening shaft connected to a central axis of the wheel at a second end of the movable fork, and serving as a rotary shaft of the wheel.

2. The steering and suspension device of claim 1, wherein the worm gear comprises:

a worm connected to a rotary shaft of the steering motor, and configured to be rotated jointly with the rotary shaft of the steering motor; and a worm wheel engaged with the worm, and configured to be rotated by rotation of the worm.

3. The steering and suspension device of claim 2, wherein:

the worm is formed as a shaft, and a thread is formed on an outer peripheral surface of the worm;

the worm wheel is formed as a circular plate, and a sawtooth is formed at an end of the worm wheel; and the driving force of the steering motor is converted into a rotational force of the worm wheel by engagement of the thread and the sawtooth.

4. The steering and suspension device of claim 3, wherein:

the sawtooth is formed only at one portion of the end of the worm wheel; and a radius of the worm wheel is set according to a forming portion of the sawtooth.

5. The steering and suspension device of claim 3, wherein a first end of the steering device connection assembly is connected to a center of the worm wheel, and is configured to be rotated in synchronization with the rotation of the worm wheel.

6. The steering and suspension device of claim 5, wherein the worm wheel is connected to the first end of the steering device connection assembly and is disposed in a direction vertical to a longitudinal direction of the steering device connection assembly.

7. The steering and suspension device of claim 1, wherein the movable fork reciprocates by a hydraulic pressure.

8. The steering and suspension device of claim 1, wherein the steering motor is connected to a steering controller (ECU) of an autonomous driving (AD) system by a sensor, and the steering motor is configured to generate a rotational force required for a steering angle and a steering direction upon a determination of the ECU using external vehicle information sensed by the sensor.

9. The steering and suspension device of claim 8, wherein the sensor includes a radar sensor.

10. The steering and suspension device of claim 1, wherein the vehicle is a purpose built vehicle (PBV) comprising a driving module and a space module coupled to a rear end of the driving module.

11. The steering and suspension device of claim 1, wherein one steering and suspension device of the vehicle is provided at a center portion of the vehicle body at the rear side of the vehicle.

\* \* \* \* \*